US012807453B2

(12) United States Patent
Chen

(10) Patent No.: US 12,807,453 B2
(45) Date of Patent: Nov. 24, 2026

(54) WIRE ORGANIZER AND WINDER THEREOF

(71) Applicant: Shenzhen Zeyiniu Technology Co., Ltd, Shenzhen (CN)

(72) Inventor: Haidong Chen, Shenzhen (CN)

(73) Assignee: Shenzhen Zeyiniu Technology Co., Ltd, Shenzhen (CN)

( * ) Notice: Subject to any disclaimer, the term of this patent is extended or adjusted under 35 U.S.C. 154(b) by 108 days.

(21) Appl. No.: 18/902,974

(22) Filed: Oct. 1, 2024

(65) Prior Publication Data

US 2026/0091952 A1 Apr. 2, 2026

(51) Int. Cl.
*B65H 75/28* (2006.01)
*B65H 75/36* (2006.01)
(Continued)

(52) U.S. Cl.
CPC .......... *B65H 75/285* (2013.01); *B65H 75/36* (2013.01); *B65H 75/362* (2013.01);
(Continued)

(58) Field of Classification Search
CPC ...... B65H 75/00; B65H 75/28; B65H 75/285; B65H 75/34; B65H 75/36; B65H 75/362; B65H 75/364; B65H 75/406; B65H 75/44; B65H 75/4457; B65H 75/4471; B65H 75/4473; B65H 75/4476; B65H 2701/30; B65H 2701/34; B65H 2701/36; B65H 2701/39; B65H 2701/3914; B65H 2701/3915; B65H 2701/3919; B65H 2701/50; B65H 2701/533; B65H 2701/536; H02G 11/00; H02G 11/02; H02G 15/10; H02G 15/113; H02G 15/115; H01R 13/60; H01R 13/72; H04R 1/10; H04R 1/1025; H04R 1/1033
See application file for complete search history.

(56) References Cited

U.S. PATENT DOCUMENTS 3,013,105 A * 12/1961 Craig .................... H01R 13/72
174/67
3,290,453 A * 12/1966 Jensen .............. B65H 75/4476
242/607.1
(Continued)

FOREIGN PATENT DOCUMENTS

KR 102179527 B1 * 11/2020 ............ B65H 75/40

*Primary Examiner* — Victoria P Augustine
*Assistant Examiner* — Raveen J Dias
(74) *Attorney, Agent, or Firm* — Jose Cherson Weissbrot

(57) ABSTRACT

The disclosure discloses a novel wire organizer, including a pedestal and a cover, where an opening and closing mechanism is arranged in the pedestal, and a fastener is arranged on a surface of an inner side of the cover; when the cover is in a closed state, the fastener is connected to claws of the opening and closing mechanism, and the cover covers the top of the pedestal; and when the cover is in an open state, the fastener is separated from the claws of the opening and closing mechanism. It is important that the opening and closing mechanism is pressed in the same direction every time, and the force direction of the opening and closing mechanism is also consistent with the direction of tightly pressing a traceless adhesive, thereby thoroughly solving the problem of force balance when wires are put in or taken out.

11 Claims, 7 Drawing Sheets

(51) Int. Cl.
*B65H 75/44* (2006.01)
*H04R 1/10* (2026.01)

(52) U.S. Cl.
CPC ..... *B65H 75/4457* (2013.01); *B65H 75/4476* (2013.01); *B65H 2701/30* (2013.01); *B65H 2701/34* (2013.01); *B65H 2701/36* (2013.01); *B65H 2701/3919* (2013.01); *B65H 2701/50* (2013.01); *H04R 1/1033* (2013.01)

(56) References Cited

U.S. PATENT DOCUMENTS

| | | | | | |
|---|---|---|---|---|---|
| 4,123,012 | A * | 10/1978 | Hough | B65H 75/06 | D8/358 |
| 5,531,333 | A * | 7/1996 | Vara | H01R 13/60 | 242/395 |
| 5,819,894 | A * | 10/1998 | Okamoto | H02G 11/02 | 191/12.4 |
| 5,915,640 | A * | 6/1999 | Wagter | B65H 75/406 | 242/388.1 |
| 6,024,317 | A * | 2/2000 | Kovacik | B65H 75/4473 | 242/405.1 |
| 6,484,787 | B1 * | 11/2002 | Walters | B65H 75/06 | 242/388.2 |
| 6,554,218 | B2 * | 4/2003 | Buyce | H02G 11/02 | 242/396.5 |
| 6,874,722 | B2 * | 4/2005 | Wei | B65H 75/368 | 242/378 |
| 7,275,956 | B1 * | 10/2007 | Montesano | H01R 9/2416 | 439/13 |
| 8,960,584 | B1 * | 2/2015 | Fearon | B65H 75/285 | 242/405 |
| 9,010,676 | B2 * | 4/2015 | DiCicco | A01K 97/06 | 242/405 |
| 9,350,151 | B2 * | 5/2016 | Michaelis, IV | H02G 3/083 | |
| 9,673,557 | B1 * | 6/2017 | Barnard | H01R 31/06 | |
| 9,755,354 | B1 * | 9/2017 | Aumiller | B65H 75/28 | |
| 10,230,200 | B1 * | 3/2019 | Tomasko | B65H 75/4471 | |
| 10,701,472 | B1 * | 6/2020 | Xu | H04R 1/1025 | |
| 10,840,615 | B2 * | 11/2020 | Newman | H01R 13/5216 | |
| 11,938,070 | B1 * | 3/2024 | Cagle | B65H 75/446 | |
| 12,312,207 | B2 * | 5/2025 | Poo | B65H 75/4473 | |
| 2003/0081396 | A1 * | 5/2003 | Smith | H02G 15/113 | 361/801 |
| 2005/0178871 | A1 * | 8/2005 | Liao | B65H 75/4434 | 242/378.1 |
| 2006/0027697 | A1 * | 2/2006 | Gojanovic | B65H 75/4434 | 242/388.1 |
| 2006/0065772 | A1 * | 3/2006 | Grant | B65H 75/36 | 242/388.6 |
| 2007/0066130 | A1 * | 3/2007 | Mori | H01R 43/00 | 439/501 |
| 2009/0035986 | A1 * | 2/2009 | Tracy | H01R 13/72 | 439/501 |
| 2009/0194630 | A1 * | 8/2009 | Thiyagarajan | H04R 1/1033 | 242/405.1 |
| 2011/0095119 | A1 * | 4/2011 | Thorn | B65H 75/2272 | 242/590 |
| 2011/0101146 | A1 * | 5/2011 | Bordignon | B65H 75/06 | 242/405.2 |
| 2011/0220754 | A1 * | 9/2011 | Merten | B65H 75/4476 | 242/400.1 |
| 2012/0322297 | A1 * | 12/2012 | Frenkil | B65H 75/28 | 248/65 |
| 2013/0193253 | A1 * | 8/2013 | Sarver | B65H 75/446 | 242/400.1 |
| 2015/0008274 | A1 * | 1/2015 | Mizuno | B60L 53/16 | 242/404 |
| 2015/0071598 | A1 * | 3/2015 | Badura | G02B 6/44775 | 385/135 |
| 2016/0355374 | A1 * | 12/2016 | Sinnett | B65H 75/366 | |
| 2017/0081146 | A1 * | 3/2017 | Dockray | B65H 75/446 | |
| 2017/0210591 | A1 * | 7/2017 | Kennedy | H04R 1/1033 | |
| 2017/0317452 | A1 * | 11/2017 | Corey | B65H 75/4476 | |
| 2018/0063622 | A1 * | 3/2018 | Song | H04R 5/0335 | |
| 2019/0027905 | A1 * | 1/2019 | Sweeney | B65H 75/446 | |
| 2019/0089187 | A1 * | 3/2019 | Konomi | H01F 38/14 | |
| 2019/0141431 | A1 * | 5/2019 | Putnam, Jr. | B65H 75/26 | |
| 2019/0319411 | A1 * | 10/2019 | Rojas Galvan | H01R 13/72 | |
| 2022/0102900 | A1 * | 3/2022 | Enger | H01R 13/44 | |

* cited by examiner

WIRE ORGANIZER AND WINDER THEREOF

TECHNICAL FIELD

The disclosure relates to the technical field of wire organization and storage, specifically to, a novel wire organizer and a winder thereof, where wires may be charging wires, data wires, power wires, etc.

BACKGROUND

With the development and progress of the science and technology, people's daily lives are increasingly inseparable from various electronic products and electrical appliances. Therefore, the rapid organization and convenient storage of charging wires, data wires, power wires of electrical appliances, and the like have become a challenge.

Currently, in the market, wire organizers and winders are used for organizing wires. Furthermore, when wires are fixed by using a wire organizer, the wires are generally clamped and fixed by physical deformation and fixed by magnetic suction flip. When wires are fixed by using a winder, the wires are generally fixed by physical deformation. However, due to limited fixing force, these two fixing ways cannot avoid charging wires, data wires, power wires, and the like falling off when being pulled by external forces. Moreover, wires of various thicknesses, clamped by physical deformation, are easy for users to put in and thus easy to detach, or difficult for users to put in and thus difficult to detach. Correspondingly, these two fixing ways cannot meet two opposite aspects, i.e., putting in and taking out, of wires of different thicknesses. Especially, the bottom of the wire organizer and the bottom of the winder are both pasted with a traceless adhesive. Therefore, whether the wire organizer for clamping and fixing by physical deformation and fixing by magnetic suction flip, or the winder for clamping and fixing by physical deformation, as wires are taken out by physical deformation or the magnetic suction is released, a peeling force will be generated in the direction of pulling the traceless adhesive, which in turn makes the wire organizer and the winder more easily peel off and fall off.

In general, the fixation of wires by physical clamping or magnetic suction flip may lead to easy detachment of the wires after pulling, and the balance of forces for putting wires in and taking wires out is affected by the thickness of wires. Especially, when wires are taken out physically or a magnetic suction cover is opened, the force is in the direction of peeling the traceless adhesive. This tends to peel off the fixed wire organizer or winder. Especially, after a period of use, as the number of use increases, the occurrence of the above problems is accelerated.

SUMMARY

In view of the defects of the prior art, the disclosure aims to provide a novel wire organizer and a winder thereof. By introducing a pressing type opening and closing mechanism, charging wires, data wires, power wires, and the like can be put in or taken out. It is important that the opening and closing mechanism is pressed in the same direction every time, and the force direction of the opening and closing mechanism is also consistent with the direction of tightly pressing a traceless adhesive, thereby thoroughly solving the problem of force balance when wires are put in or taken out. Furthermore, by pressing every time (opening or closing the cover), the pasting force of the traceless adhesive is increased to thoroughly solve the problems of durability and peeling in the prior art. In addition, the disclosure further provides a bracket for mounting a wire organizer to form a winder.

In order to achieve the above objectives, the disclosure adopts the following technical solution:

A novel wire organizer is provided, including a pedestal and a cover movably covering the top of the pedestal, where an opening and closing mechanism is arranged in the pedestal, and a fastener is arranged on a surface of an inner side of the cover; when the cover is in a closed state, the fastener is connected to claws of the opening and closing mechanism, and the cover covers the top of the pedestal; and when the cover is in an open state, the fastener is separated from the claws of the opening and closing mechanism.

It should be noted that the opening and closing mechanism further includes a movable component, a spring and a toggle spring; one end of the claw is connected to the top of the movable component, and the other end of the claw is a free end; an accommodating cavity is arranged in the movable component, and one end of the spring is arranged in the accommodating cavity; a surface of the movable component is provided with a guide groove, and one end of the toggle spring is located in the guide groove and is slidable along the guide groove; and when the cover is in the closed state, the fastener is captured by the claws, and the cover covers the top of the pedestal.

It should be noted that the novel wire organizer further includes a first directional island and a second directional island which are respectively arranged in the guide groove, the first directional island being arranged at an end away from the toggle spring in the guide groove, and the second directional island being arranged between the first directional island and the toggle spring, where a first guide surface and a second guide surface are respectively arranged on both sides of the first directional island, a positioning groove is arranged at one end of the second directional island, and a third guide surface and a fourth guide surface are respectively arranged on both sides of the second directional island; and when the cover is in the closed state, one end of the toggle spring slides into the positioning groove.

It should be noted that in a closing process of the cover, one end of the toggle spring is located at an initial position and slides along the third guide surface to the first guide surface, and then slides along the first guide surface into the positioning groove; and in an opening process of the cover, one end of the toggle spring is detached from the positioning groove and slides upward along the second guide surface, and then returns downward along the fourth guide surface to the initial position.

It should be noted that the novel wire organizer further includes a box, where the movable component is arranged in the box, a positioning post is arranged on one side in the box, the other end of the spring is threaded through the positioning post, and an end thereof abuts against a surface of one side in the box; the other end of the toggle spring is rotatably connected to the other side in the box; when the cover is in the open state, the claws extend out of the box; and when the cover is in the closed state, the free ends of the claws are close to each other along inner peripheral edges of both sides of the top of the box, and the fastener is captured and then stored in the box.

It should be noted that the pedestal includes a base and a base body fastened to the top of the base; a slot is arranged in one side of the base body, the cover is rotatably connected in the slot, and a mounting post is arranged on one side of the base; and during fastening, the mounting post extends into the slot.

It should be noted that the base body is provided with an arc-shaped groove, and the cover is provided with an arc-shaped hole; and when the cover is in the closed state, the arc-shaped groove and the arc-shaped hole form a space for wires to pass through.

It should be noted that the bottom of the base is covered with a traceless adhesive for pasting and fixing.

Further, based on the structure of the above wire organizer, the disclosure further provides a winder with the novel wire organizer. The winder consists of a bracket and a wire organizer mounted in the bracket, where the bracket includes a bottom plate and wing parts, and the wing parts are respectively arranged on surfaces of both sides of the bottom plate and extend outward; at least one wire organizer is arranged between the wing parts; and the bottoms of the wing parts and the surfaces of both sides of the bottom plate form a space for wire winding.

It should be noted that the bottom of the bottom plate is provided with a plurality of separation grooves.

It should be noted that at least one mounting counter bore matched with the base of the wire organizer in size is arranged between the wing parts, and the at least one wire organizer is pasted in the mounting counter bore through the traceless adhesive.

It should be noted that concave parts are arranged on inner sides of joints between the wing parts and the surfaces of both sides of the bottom plate, and the concave part is matched with one side of the base of the wire organizer in size; and after the wire organizer is pasted in the mounting counter bore, one side of the base of the wire organizer is embedded in the concave part.

The disclosure has the following beneficial effects:

1. The disclosure is small in occupied volume, simple in structure and very convenient in opening and closing operations, can be directly operated with only one finger, is suitable for charging wires and data wires commonly used in offices, and is also suitable for power wires for household appliances.
2. The cover can be closed by slightly pressing once to ensure that wires cannot be detached, thereby thoroughly solving the problem of wire detachment.
3. The cover can be opened by slightly pressing once to ensure that wires can be taken out smoothly.
4. Whether opened or closed, the cover is pressed in the same direction, thereby thoroughly solving the problem of force balance when wires are put in or taken out.
5. Whether opened or closed, the cover is pressed in the same direction (that is, the cover is pressed in a pasting direction of the traceless adhesive), thereby increasing the pasting force of the traceless adhesive to thoroughly solve the problem of durability and peeling.
6. The wire organizer of the disclosure can be combined with the bracket of the disclosure to form the winder. A wire can be wound from the wire organizer of the disclosure or from the wing parts of the bracket of the disclosure. The number of turns of winding can be controlled freely. Finally, the remaining length of the wire is controlled, and the end of the wire is fixed in the wire organizer of the disclosure.
7. By arranging a plurality of wire organizers at multiple positions in the bracket of the disclosure, the wire is wound clockwise or counterclockwise from the wing parts of the bracket, and the remaining length of the wire after winding can be freely fixed on wire organizers at different positions on the bracket.

DETAILED DESCRIPTION

The disclosure will be further described below with reference to the accompanying drawings. It should be noted that based on the technical solution, the following embodiment proposes detailed implementations and specific operation processes, but the protection scope of the disclosure is not limited to this embodiment.

Figure 1:
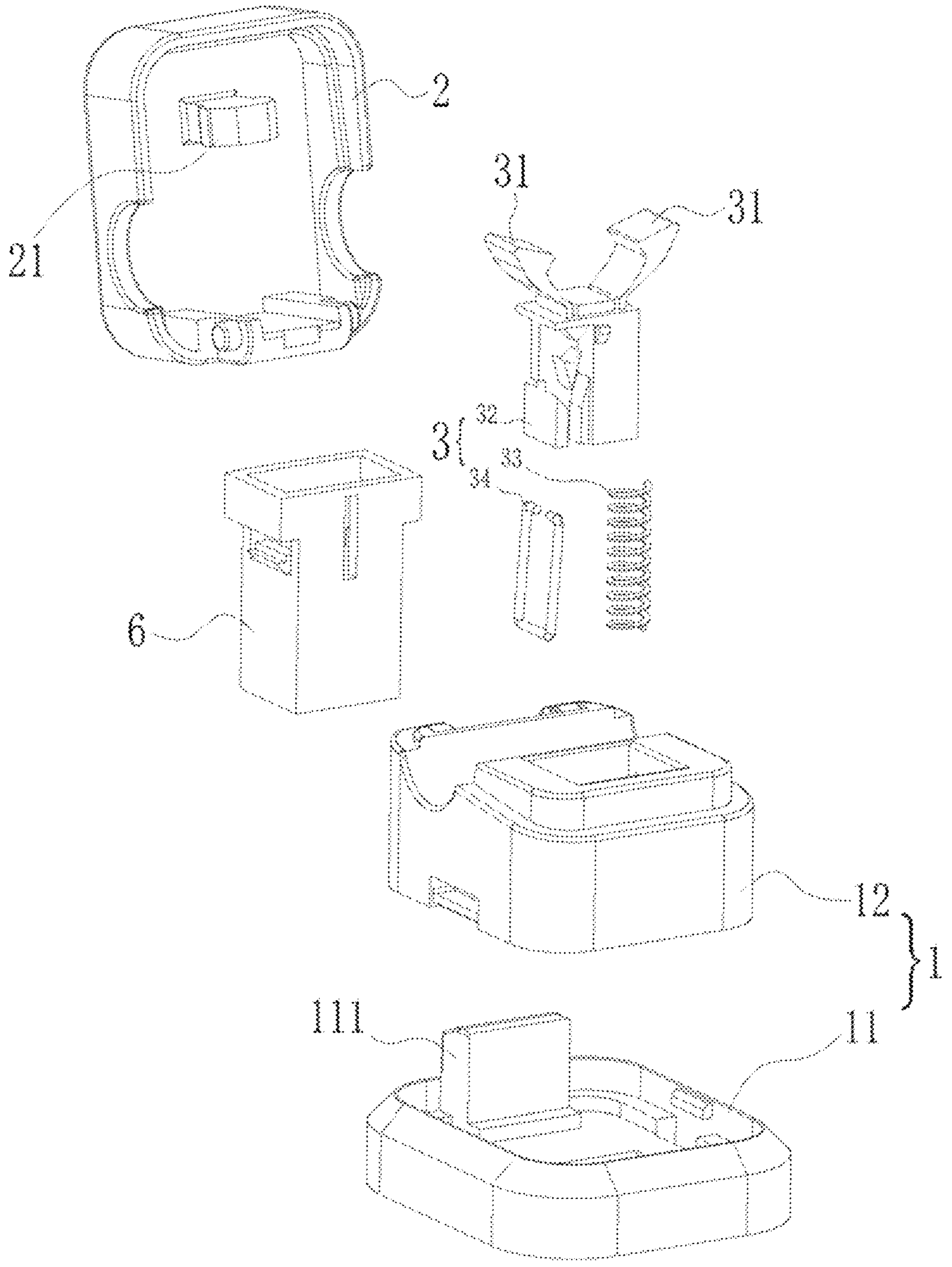
FIG. 1 is a schematic structural diagram of a wire organizer of the disclosure.

As shown in FIG. 1, the disclosure provides a novel wire organizer, including a pedestal 1 and a cover 2 movably covering the top of the pedestal 1. An opening and closing mechanism 3 is arranged in the pedestal 1, and a fastener 21 is arranged on a surface of an inner side of the cover 2. When the cover 2 is in a closed state, the fastener 21 is connected to claws 31 of the opening and closing mechanism 3, and the cover 2 covers the top of the pedestal 1. When the cover 2 is in an open state, the fastener 21 is separated from the claws 31 of the opening and closing mechanism 3.

Figure 2:
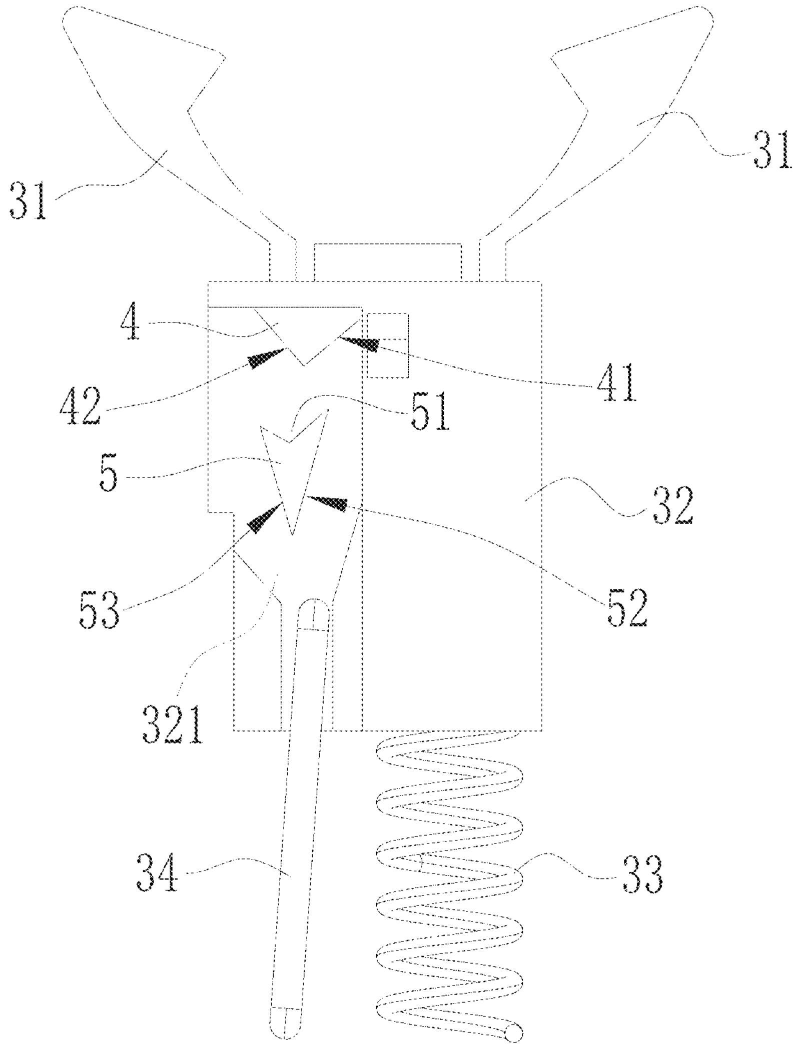
FIG. 2 is a schematic structural diagram of an opening and closing mechanism of the disclosure.
Figure 3:
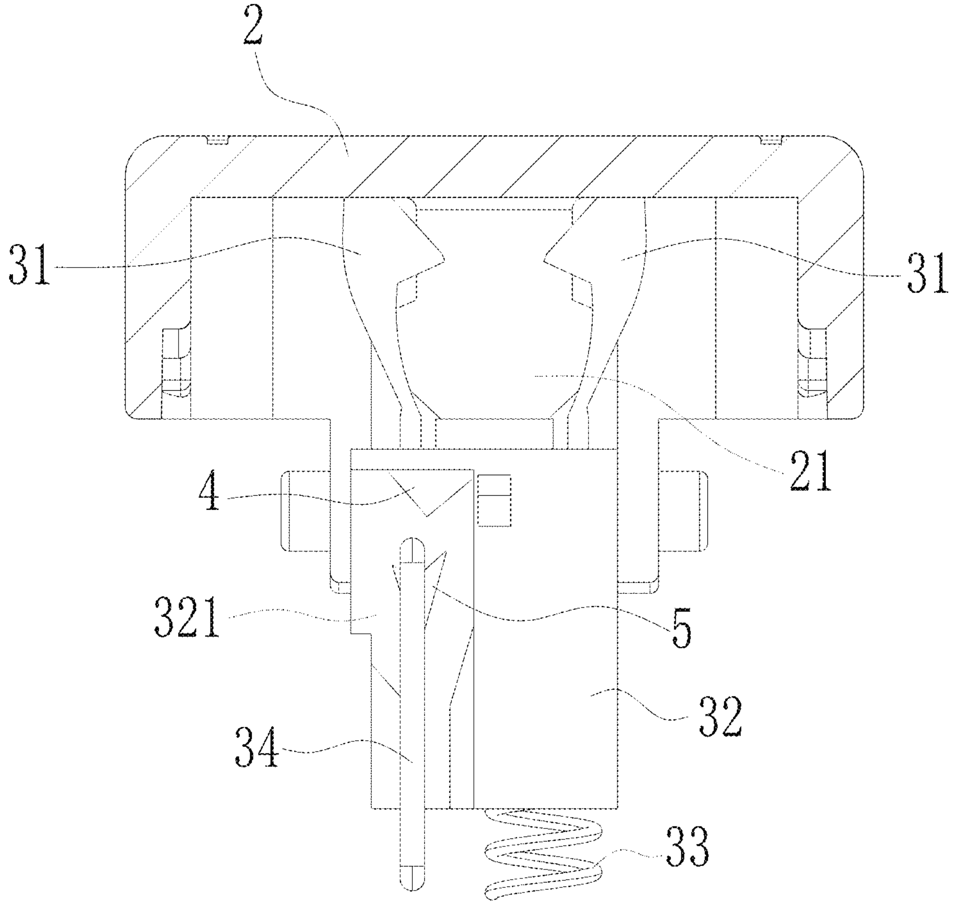
FIG. 3 is a schematic structural diagram of connection between a cover and an opening and closing mechanism of the disclosure.

Further, as shown in FIG. 2 and FIG. 3, the opening and closing mechanism 3 of the disclosure further includes a movable component 32, a spring 33 and a toggle spring 34. One end of the claw 31 is connected to the top of the movable component 32, and the other end of the claw 31 is a free end. An accommodating cavity is arranged in the movable component 32, and one end of the spring 33 is arranged in the accommodating cavity. A surface of the movable component 32 is provided with a guide groove 321, and one end of the toggle spring 34 is located in the guide groove 321 and is slidable along the guide groove 321. When the cover 2 is in the closed state, the fastener 21 is captured by the claws 31, and the cover 2 covers the top of the pedestal 1.

It should be pointed out that in the process of closing the cover, the fastener of the cover presses the claws downward. In this process, the movable component moves downward under force, and the spring is compressed under force. After the toggle spring slides along the guide groove to a designated position, the claws completely capture the fastener, and the cover is closed.

Further, as shown in FIG. 2 and FIG. 3, the novel wire organizer of the disclosure further includes a first directional island 4 and a second directional island 5 which are respectively arranged in the guide groove 321. The first directional island 4 is arranged at an end away from the toggle spring 34 in the guide groove 321, and the second directional island 5 is arranged between the first directional island 4 and the toggle spring 34. A first guide surface 41 and a second guide surface 42 are respectively arranged on both sides of the first directional island 4, a positioning groove 51 is arranged at one end of the second directional island 5, and a third guide surface 52 and a fourth guide surface 53 are respectively arranged on both sides of the second directional island 5. When the cover 2 is in the closed state, one end of the toggle spring 43 slides into the positioning groove 51.

As a preferred technical solution, the first directional island and the second directional island of the disclosure both adopt a structure similar to a triangle. Of course, other shapes in the prior art may also be used as alternatives.

As a preferred technical solution, as shown in FIG. 2, the positioning groove 51 of the disclosure is a V-shaped groove. After one end of the toggle spring slides to the positioning groove, the V-shaped groove effectively avoids the accidental detachment of the toggle spring from the positioning groove caused by shaking due to external forces, thereby preventing the cover from being opened accidentally.

It should be pointed out that in order to ensure that the toggle spring smoothly slides from the first guide surface of the first directional island into the positioning groove of the second directional island, as a preferred technical solution, a first intersection point formed by the first guide surface and the second guide surface is not coaxial with the lowest point in the above V-shaped groove.

Figure 4:
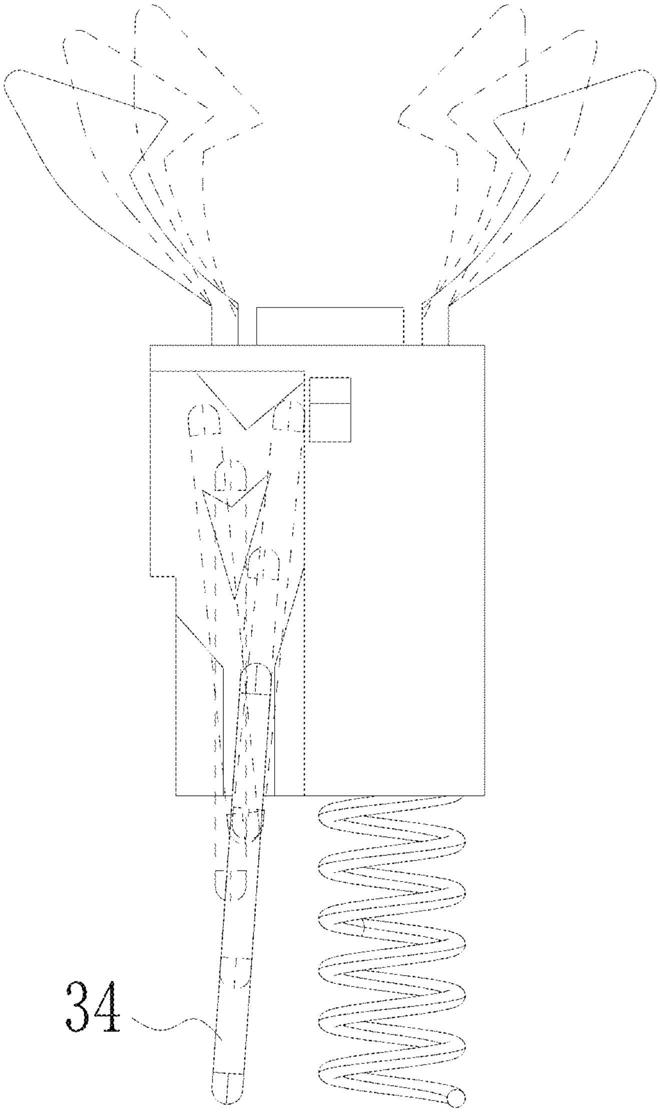
FIG. 4 is a schematic diagram of a sliding travel of a toggle spring of the disclosure in a guide groove.

Further, as shown in FIG. 2 and FIG. 4, a sliding process of the toggle spring of the disclosure in the guide groove is shown. Specifically, in a closing process of the cover of the disclosure, one end of the toggle spring 34 is located at an initial position and slides along the third guide surface 52 to the first guide surface 41, and then slides along the first guide surface 41 into the positioning groove 51; and in an opening process of the cover, one end of the toggle spring 34 is detached from the positioning groove and slides upward along the second guide surface 42, and then returns downward along the fourth guide surface 53 to the initial position.

It should be pointed out that in the above complete closing and opening processes of the cover, the sliding trajectory of the toggle spring of the disclosure in the guide groove is similar to a letter “M”.

Figure 5:
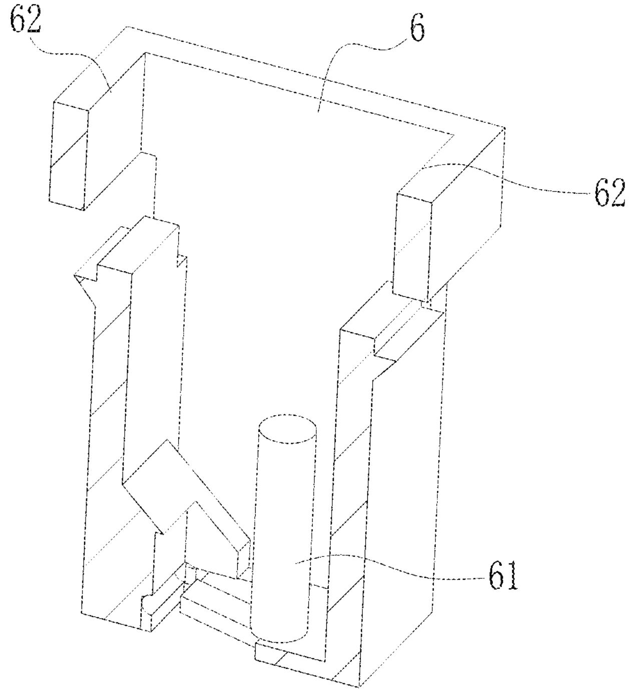
FIG. 5 is a schematic structural diagram of a box of the disclosure.

Further, as shown in FIG. 1 and FIG. 5, the novel wire organizer of the disclosure further includes a box 6. The movable component 32 is arranged in the box 6, a positioning post 61 is arranged on one side in the box 6, the other end of the spring 33 is threaded through the positioning post 61, and an end thereof abuts against a surface of one side in the box 6. The other end of the toggle spring 34 is rotatably connected to the other side in the box 6. When the cover 2 is in the open state, the claws 31 extend out of the box 6. When the cover 2 is in the closed state, the free ends of the claws 31 are close to each other along inner peripheral edges 62 of both sides of the top of the box 6, and the fastener 21 is captured and then stored in the box 6.

It should be pointed out that in the closing or opening process of the cover, the movable component of the disclosure moves up and down in the box until one end of the toggle spring slides into the positioning groove or one end of the toggle spring returns to the initial position.

It should be further pointed out that the toggle spring of the disclosure is rotatably connected to the other side in the box, and a manner of connection between a rotating shaft and a rotating hole in the prior art may be adopted.

Figure 6:
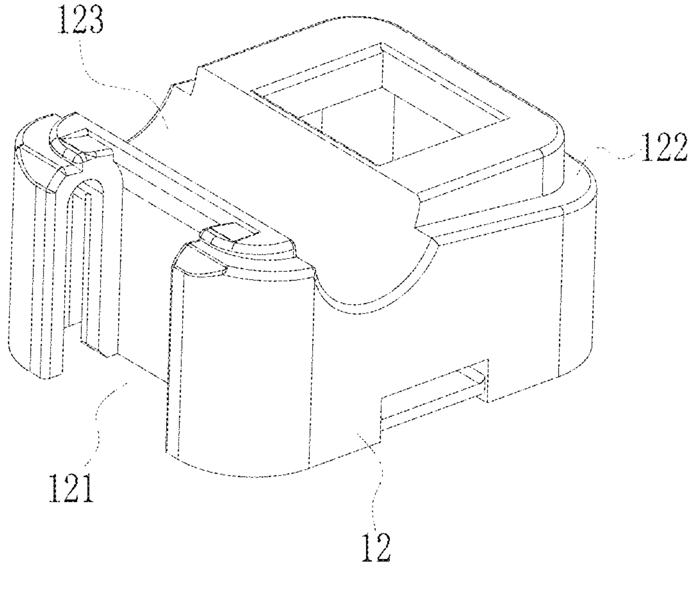
FIG. 6 is a schematic structural diagram of a base body of the disclosure.

Further, as shown in FIG. 1 and FIG. 6, the pedestal 1 of the disclosure includes a base 11 and a base body 12 fastened to the top of the base 11. A slot 121 is arranged in one side of the base body 12, the cover 2 is rotatably connected in the slot 121, and a mounting post 111 is arranged on one side of the base 11. During fastening, the mounting post 111 extends into the slot 121.

It should be pointed out that in the closing process of the cover of the disclosure, the spring is gradually compressed. When one end of the toggle spring slides to an end of the first guide surface of the first directional island, the spring is in a fully compressed state. In this case, the downward pressure applied to the cover is released, and the spring rebounds to drive the movable component to move upward. However, the toggle spring will slide from the end of the first guide surface along the first guide surface to the positioning groove. In this way, the toggle spring limits the upward movement of the movable component, and the spring stops rebounding to achieve force balance, so that the cover can be closed. Based on the above process, in order to form the fully compressed state of the spring, as shown in FIG. 6, the disclosure is provided with an inclined step structure 122 that slopes down on the surface of the base body 12 to ensure that the spring is in the fully compressed state when the cover is pressed downward to abut against the inclined step structure 122 (this process is referred to as a fully pressed state of the cover in the disclosure). After the downward pressure applied to the cover is released, the cover is suspended in a horizontal position through the connection relationship between the toggle spring and the positioning groove. Similarly, in the opening process of the cover, the downward pressure is applied to the cover until the cover abuts against the inclined step structure 122. In this case, the spring is in the fully compressed state again, and the toggle spring is also detached from the positioning groove and slides to an end of the second guide surface of the first directional island. After the downward pressure applied to the cover is released again, the toggle spring returns to the initial position along the second guide surface and the fourth guide surface, and the cover is opened.

Figure 7:
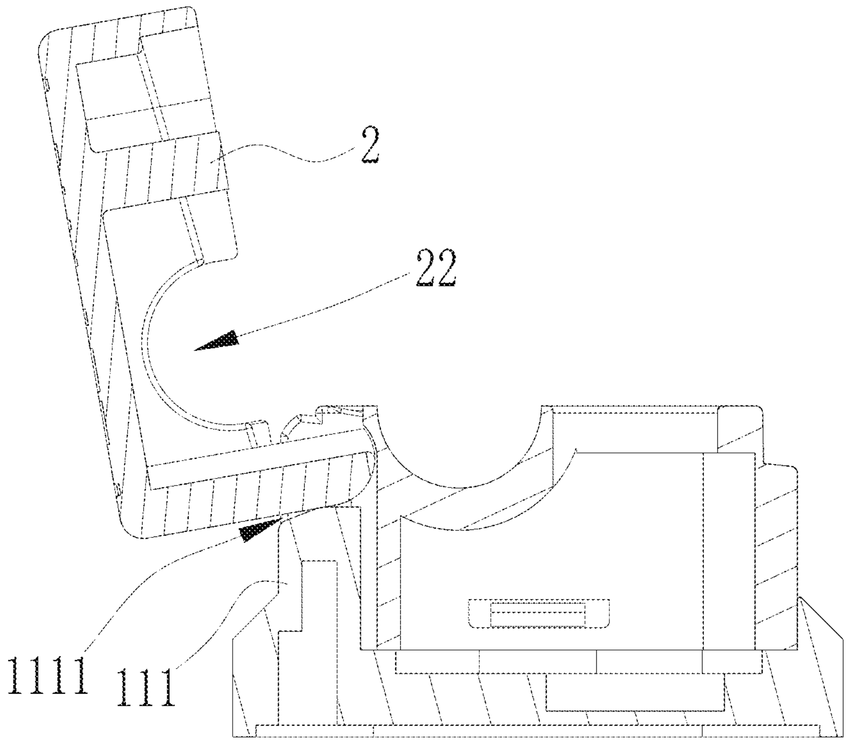
FIG. 7 is a schematic structural diagram of a fully opened cover of the disclosure.

Further, as shown in FIG. 6 and FIG. 7, the base body 12 of the disclosure is provided with an arc-shaped groove 123, and the cover 2 is provided with an arc-shaped hole 22. When the cover 2 is in the closed state, the arc-shaped groove 123 and the arc-shaped hole 22 form a space for wires to pass through.

It should be pointed out that in order to ensure that the disclosure can meet the requirement for various data wires, charging wires and power wires to pass through, the inner diameter of the arc-shaped groove of the disclosure reaches 7 mm. However, based on the structural features of the disclosure, in the closing or opening process of the cover, the cover will be in a fully pressed state. Therefore, in order to avoid damage to wires, the inner diameter of the arc-shaped hole of the disclosure is designed to be 8 mm. When the cover is in the fully pressed state, it is ensured that there is a certain residual space for wire protection.

It should be pointed out that in order to prevent the cover of the disclosure from interfering with a top end surface of the mounting post after being fully opened, further squeezing the base and causing the connection between the base and the base body to loosen, as shown in FIG. 7, the mounting post 111 of the disclosure is provided with a slope 1111. After the cover is fully opened, a certain gap is formed between the slope 1111 and the cover 2 to avoid the occurrence of the above problems.

Further, the bottom of the base of the disclosure is covered with a traceless adhesive for pasting and fixing.

Figure 8:
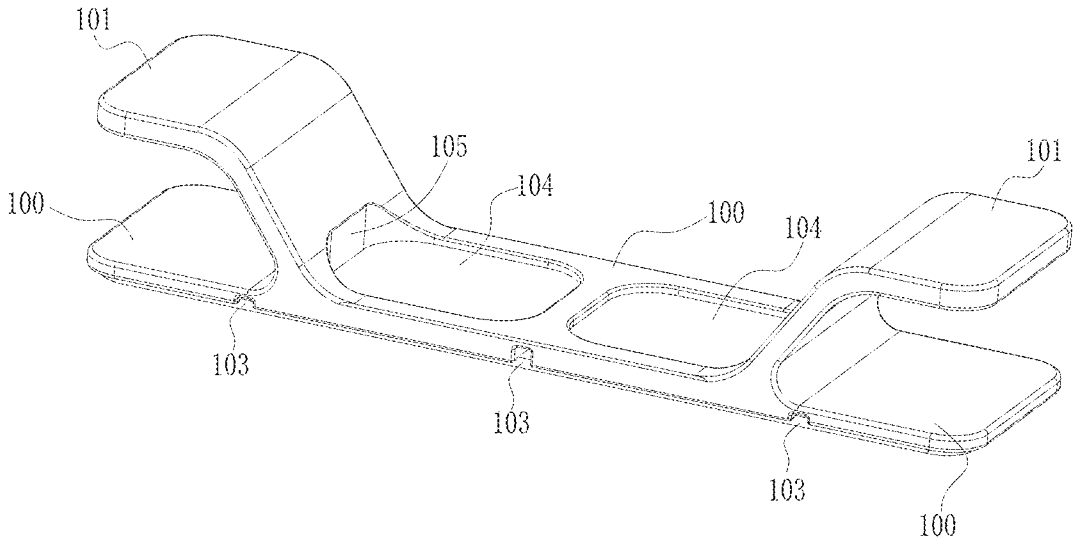
FIG. 8 is a schematic structural diagram of a bracket of the disclosure.
Figure 9:
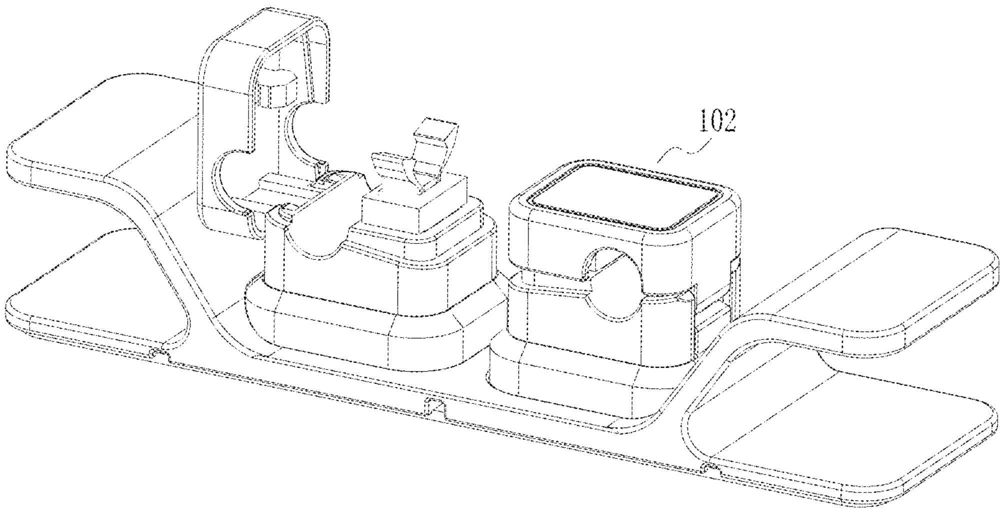
FIG. 9 is a schematic diagram of a wire organizer mounted on a bracket to form a winder of the disclosure.

As shown in FIG. 8 and FIG. 9, as a further extension and application of the above wire organizer, on the basis of the structure of the wire organizer, the disclosure further provides a winder combination with the novel wire organizer. The winder combination consists of a bracket and a wire organizer mounted in the bracket. Specifically, the bracket includes a bottom plate 100 and wing parts 101, and the wing parts 101 are respectively arranged on surfaces of both sides of the bottom plate 100 and extend outward. At least one wire organizer 102 is arranged between the wing parts 101; and the bottoms of the wing parts 101 and the surfaces of both sides of the bottom plate 100 form a space for wire winding.

Further, as shown in FIG. 8, the bottom of the bottom plate 100 of the disclosure is provided with several separation grooves 103.

It should be pointed out that the above bracket of the disclosure may also be provided with a traceless adhesive at the bottom of the bottom plate for pasting. However, some electrical appliances have a certain curved surface. If a whole piece of traceless adhesive is used for pasting, the traceless adhesive will have a force along the curved surface to restore an initial state, which is not conducive to pasting. Therefore, through the separation grooves arranged above, the traceless adhesive can be divided into a plurality of small pieces to fully alleviate the influence on the pasting effect of the curved surface of an electrical appliance.

Further, as shown in FIG. 8 and FIG. 9, at least one mounting counter bore 104 matched with the base of the wire organizer 102 in size is arranged between the wing parts 101 of the disclosure, and the at least one wire organizer 102 is pasted in the mounting counter bore 104 through the traceless adhesive.

Further, as shown in FIG. 8 and FIG. 9, because the space is formed between the wing parts on both sides of the disclosure and both sides of the bottom plate, the ends of the wing parts on both sides, extending outward, are suspended. Therefore, after the bracket is wound with wires, one end of each of the wing parts on both sides will undergo an inward elastic deformation, and the pressure of the inward deformation to acts on the wire organizer to ensure that it is more difficult for the wire organizer to be detached from the bracket.

As a preferred technical solution, as shown in FIG. 8, concave parts 105 may be arranged on inner sides of joints between the wing parts 101 and the bottom plate 100, and the concave part 105 is matched with one side of the base of the wire organizer in size; and after the wire organizer is pasted in the mounting counter bore 104, one side of the base of the wire organizer is embedded in the concave part 105. Through the structure, the wire organizer can be further fixed in the bracket 100.

Embodiment

When the wire organizer of the disclosure is used alone, one end of a wire is put in the arc-shaped groove, the cover is pressed downward to achieve connection between the cover and the above specific opening and closing mechanism, and finally, the wire organizer is pasted at a desired position through the traceless adhesive at the bottom of the wire organizer.

Of course, a user can configure several wire organizers to use simultaneously according to the number of wires.

Based on the wire organizer of the disclosure, the disclosure further provides a winder. Specifically, at least one wire organizer is pasted in the bracket through the traceless adhesive, then one end of a wire is put in the arc-shaped groove of the wire organizer, the cover is pressed downward to achieve connection between the cover and the above specific opening and closing mechanism, the other end of the wire is wound around the wing part of the bracket, and finally, the bracket is pasted at a desired position through the traceless adhesive at the bottom of the bracket.

Of course, the user can also wind one end of the wire around the wing part of the bracket first, and then fix the end of the remaining wire in the wire organizer.

Those skilled in the art can make various corresponding changes and deformations according to the technical solution and concept described above. All these changes and deformations should be included within the protection scope of the claims of the disclosure.

What is claimed is:

1. A novel wire organizer, comprising a pedestal and a cover movably covering a top of the pedestal, wherein an opening and closing mechanism is arranged in the pedestal, and a fastener is arranged on a surface of an inner side of the cover; when the cover is in a closed state, the fastener is connected to claws of the opening and closing mechanism, and the cover covers the top of the pedestal; and when the cover is in an open state, the fastener is separated from the claws of the opening and closing mechanism;

wherein the opening and closing mechanism further comprises a movable component, a spring and a toggle spring; one end of each claw is connected to a top of the movable component, and the other end of each claw is a free end; an accommodating cavity is arranged in the movable component, and one end of the spring is arranged in the accommodating cavity; a surface of the movable component is provided with a guide groove, and one end of the toggle spring is located in the guide groove and is slidable along the guide groove; and when the cover is in the closed state, the fastener is captured by the claws, and thus the cover covers the top of the pedestal.

2. The novel wire organizer according to claim 1, further comprising a first directional island and a second directional island which are respectively arranged in the guide groove, the first directional island being arranged at an end away from the toggle spring in the guide groove, and the second directional island being arranged between the first directional island and the toggle spring, wherein a first guide surface and a second guide surface are respectively arranged on both sides of the first directional island, a positioning groove is arranged at one end of the second directional island, and a third guide surface and a fourth guide surface are respectively arranged on both sides of the second directional island; and when the cover is in the closed state, one end of the toggle spring slides into the positioning groove.

3. The novel wire organizer according to claim 2, wherein in a closing process of the cover, one end of the toggle spring is located at an initial position and slides along the third guide surface to the first guide surface, and then slides along the first guide surface into the positioning groove; and in an opening process of the cover, one end of the toggle spring is detached from the positioning groove and slides upward along the second guide surface, and then returns downward along the fourth guide surface to the initial position.

4. The novel wire organizer according to claim 1, further comprising a box, wherein the movable component is arranged in the box, a positioning post is arranged on one side in the box, the other end of the spring is threaded through the positioning post, and an end thereof abuts against a surface of one side in the box; the other end of the toggle spring is rotatably connected to the other side in the box; when the cover is in the open state, the claws extends out of the box; and when the cover is in the closed state, the free ends of the claws are close to each other along inner peripheral edges of both sides of a top of the box, and the fastener is captured and then stored in the box.

5. The novel wire organizer according to claim 1, wherein the pedestal comprises a base and a base body fastened to a top of the base; a slot is arranged in one side of the base body, the cover is rotatably connected in the slot, and a mounting post is arranged on one side of the base; and during fastening, the mounting post extends into the slot.

6. The novel wire organizer according to claim 5, wherein the base body is provided with an arc-shaped groove, and the cover is provided with an arc-shaped hole; and when the cover is in the closed state, the arc-shaped groove and the arc-shaped hole form a space for wires to pass through.

7. The novel wire organizer according to claim 5, wherein a bottom of the base is covered with a traceless adhesive for pasting and fixing.

8. The novel wire organizer according to claim 7, wherein at least one mounting counter bore that matched with the base of the wire organizer in size, is arranged between the wing parts, and the wire organizer is pasted in the at least one mounting counter bore through the traceless adhesive.

9. The novel wire organizer according to claim 8, wherein concave parts are arranged on inner sides of joints between the wing parts and the surfaces of the both sides of the bottom plate, and each concave part is matched with one side of the base of the wire organizer in size; and after the wire organizer is pasted in the mounting counter bore, one side of the base of the wire organizer is embedded in each corresponding concave part.

10. The novel wire organizer according to claim 1, wherein a winder consists of a bracket and a wire organizer mounted in the bracket; the bracket comprises a bottom plate and wing parts, and the wing parts are respectively arranged on surfaces of both sides of the bottom plate and extend outward; the wire organizer is arranged between the wing parts; and bottoms of the wing parts and the surfaces of the both sides of the bottom plate form a space for wire winding.

11. The novel wire organizer according to claim 10, wherein a bottom of the bottom plate is provided with several separation grooves.

* * * * *